United States Patent [19]

Smolik

[11] Patent Number: 4,576,302
[45] Date of Patent: Mar. 18, 1986

[54] ELECTRICAL RECEPTACLE BOX ASSEMBLY

[76] Inventor: Robert A. Smolik, 670 West Seventh St., St. Paul, Minn. 55102

[21] Appl. No.: 730,490

[22] Filed: May 6, 1985

[51] Int. Cl.[4] ............................................. H02G 3/10
[52] U.S. Cl. ..................... 220/3.5; 174/58; 220/3.3; 220/3.9; 248/221.2; 248/222.2; 248/223.3; 248/DIG. 6
[58] Field of Search ........................ 220/3.9, 3.92, 3.5, 220/3.6, 3.3, 18; 174/58; 248/DIG. 6, 27.1, 221.1, 221.2, 223.3, 224.4, 221.4, 225.2, 231.8, 222.2, 222.3, 225.1, 221.3, 231.9; 24/295, 458, 573

[56] References Cited

U.S. PATENT DOCUMENTS

| | | | |
|---|---|---|---|
| 755,116 | 3/1904 | Dreyer | 248/224.4 X |
| 1,803,016 | 4/1931 | Harsted | 248/221.2 |
| 1,852,598 | 4/1932 | Vost | 248/223.3 X |
| 1,976,889 | 10/1924 | Place | 24/295 X |
| 2,790,616 | 4/1957 | Cardinal, Jr. | 248/223.3 |
| 3,187,924 | 6/1965 | Marcus | 220/18 |
| 3,222,023 | 12/1965 | Schweitzer | 248/221.1 |
| 3,489,382 | 1/1970 | Larson | 248/221.1 |
| 4,403,708 | 9/1983 | Smolik | 220/3.9 X |
| 4,483,453 | 11/1984 | Smolik | 220/3.9 X |

*Primary Examiner*—Allan N. Shoap
*Attorney, Agent, or Firm*—Burd, Bartz & Gutenkauf

[57] ABSTRACT

An electrical receptacle box assembly including an electrical receptacle box mounted on a wall stud having a relatively thin-walled major side surface prepared with a plurality of vertically spaced apart mounting holes in patterns of two. The electrical receptacle box is equipped with first and second bracket means, each engageable with a corresponding mounting hole. One of the bracket means includes a clip having a plurality of longitudinal fingers. One of the fingers is offset from the others so as to be engageable with a mounting hole in straddling relationship to an edge of the hole. The other fastener includes a linear portion extendible through the opposite mounting hole and connected to a side wall of the electrical receptacle box. The box is quickly and securely engageable with the wall stud preparatory to mounting electrical receptacles and eventual covering with wallboard.

16 Claims, 7 Drawing Figures

ELECTRICAL RECEPTACLE BOX ASSEMBLY

BACKGROUND OF THE INVENTION

The invention relates to the field of electrical receptacle boxes mountable on a generally vertical wall stud of the type having a thin-walled major side member, such as a metal wall stud commonly used in building construction.

For considerations of durability, longevity and fire resistance, metal wall studs are commonplace in commercial and residential building construction. As compared to common wooden wall studs, special problems are presented when mounting certain equipment, such as electrical receptacle boxes to hold outlets, switches and the like because the metal wall stud is not as readily penetrable by common fasteners as is the wooden stud. In the prior art, various clips and clamps are used which forcibly engage an edge of the stud leaving a bulge when covered by wallboard. Screw fasteners are also used but are time consuming and in commercial building construction, conservation of time is a relevant factor in containing costs.

SUMMARY OF THE INVENTION

The present invention comprises an electrical receptacle box assembly including an electrical receptacle box mountable on a wall stud having a relatively thin-walled major side surface, such as a metal wall stud. The metal wall stud is prepared with a plurality of holes in patterns of two which are vertically spaced apart when the wall stud is in an upright orientation. The holes are oblong in shape with a horizontal major axis to provide elongate mounting edges.

The electrical receptacle box is equipped with a side wall having vertically spaced apart bracket means or fasteners for assembly with first and second holes of a hole pattern. One of the fasteners is comprised as a clip having a plurality of fingers which straddle one of the edges of a mounting hole. The other fastener is comprised as either a prong or tine which is insertable through the mounting hole under slight spring deflection, or as a tab which receives a self-threading screw which passes through the tab and engages the hole edges. The box is quickly and securely assembled to the wall stud with a resultant savings of time.

In those instances where a box is to be assembled on the interior surface of the major side wall member of a U-shaped metal wall stud, a spacer or extension member is provided. The extension member is mounted between the wall stud and the electical receptacle box to space the box outward of the stud.

IN THE DRAWINGS

DESCRIPTION OF PREFERRED EMBODIMENTS

Figure 1:
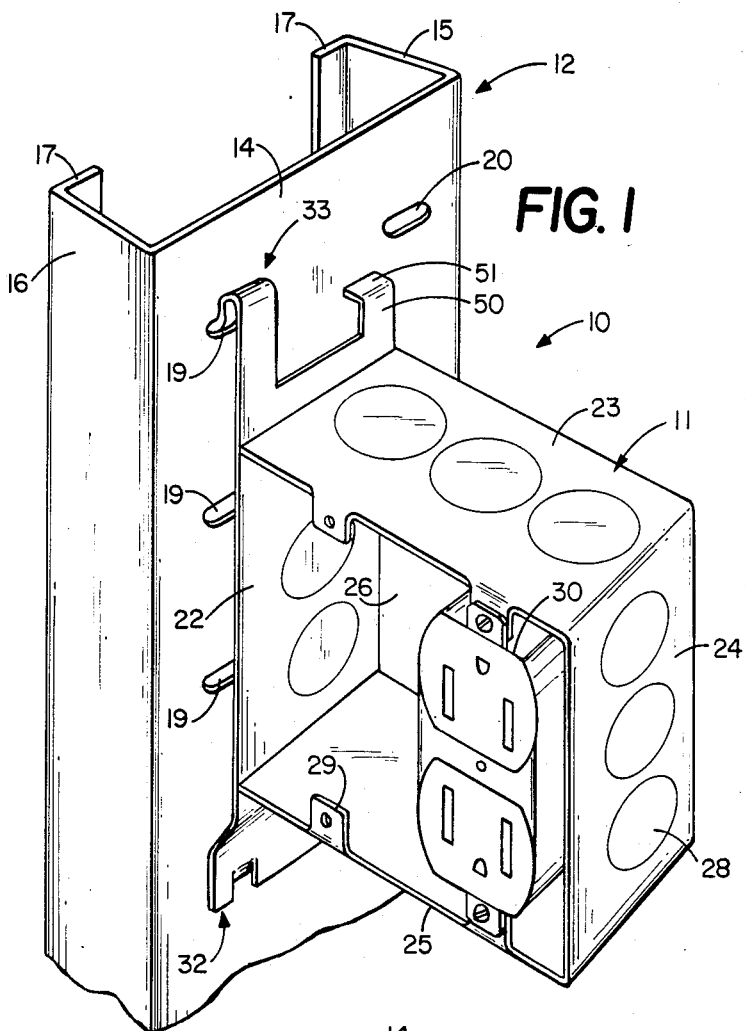
FIG. 1 is a prespective view of an electrical receptacle box assembly according to one form of the invention including electrical receptacle box mounted to a generally upright wall stud.
Figure 2:
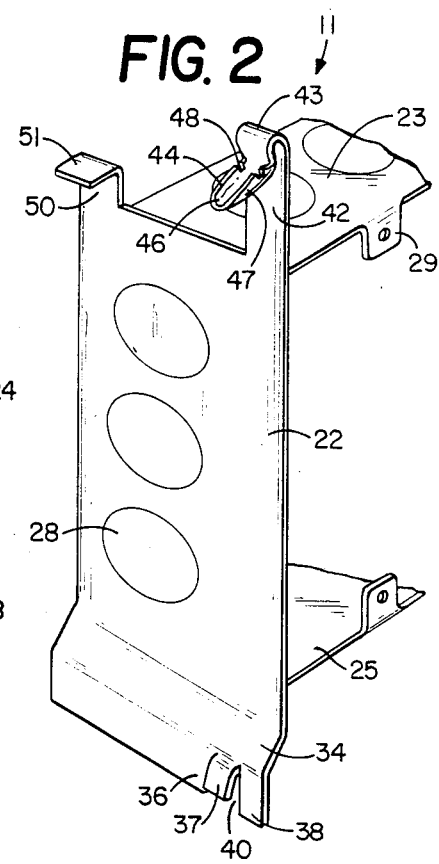
FIG. 2 is another perspective view of a portion of the electrical receptacle box of FIG. 1.
Figure 3:
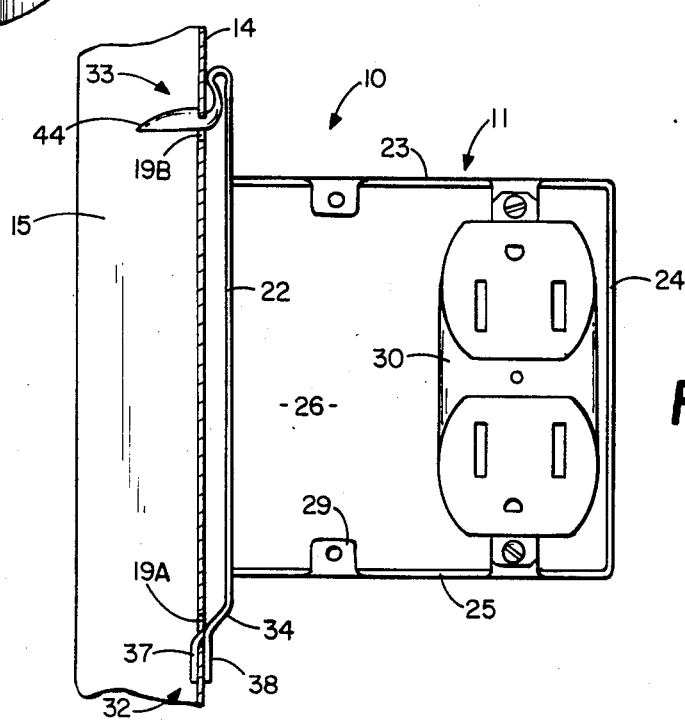
FIG. 3 is a front elevational view of the electrical receptacle box of FIG. 1 with portions of the wall stud removed for illustration.
Figure 4:
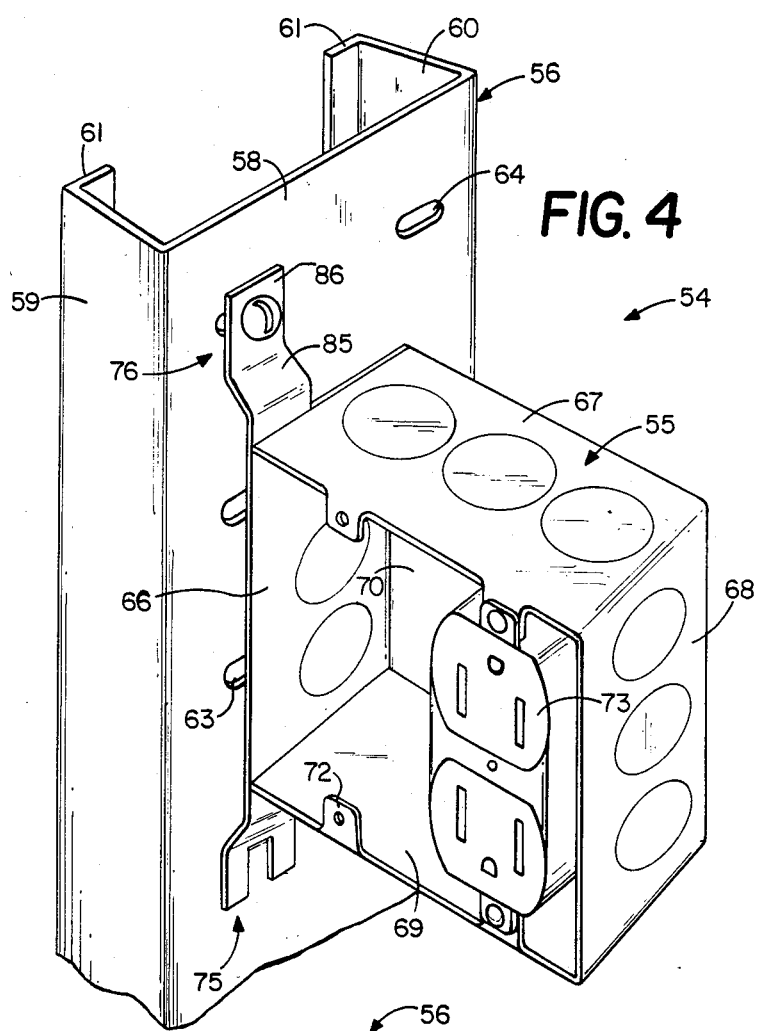
FIG. 4 is a perspective view of an electical receptacle box assembly according to another form of the invention showing an electrical receptacle box mounted to a generally upright wall stud.
Figure 5:
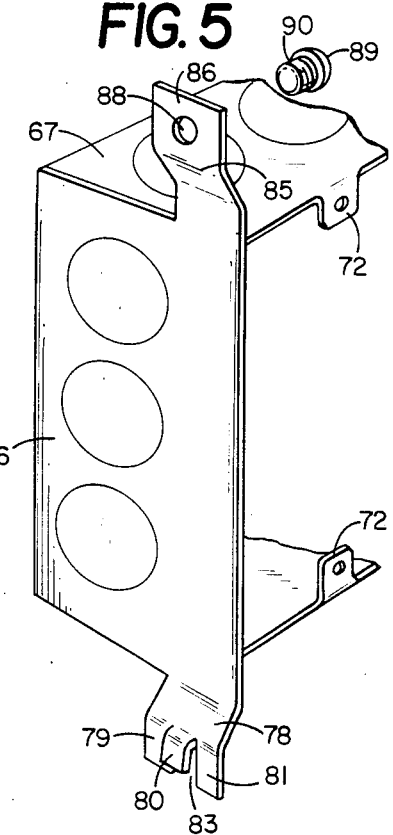
FIG. 5 is another perspective view of a portion of the electrical receptacle box of FIG. 4.

Referring to the drawings, there is shown in FIGS. 1 through 3 an electrical receptacle box assembly according to the invention indicated generally at 10 and including an electrical receptacle box 11 mounted on a generally upright wall stud 12. Wall stud 12 is of the variety having a relatively thin-walled major side member 14 with perpendicularly orientated end members 15, 16 and relatively short in-turned lips or flanges 17, as is characteristic of metal wall studs commonly used in building construction. Major side member 14 is prepared with a vertical row of linearly aligned mounting holes or openings 19 proximate one edge which are spaced apart in hole patterns of two, for purposes which will be described. A second row of mounting openings 20 can be provided proximate the oposite edge of major side member 14 to increase the versatility of the metal wall stud. The openings 19, 20 are oval or oblong with a major axis horizontally orientated when the metal wall stud is in the generally upright orientation as shown.

Electrical receptacle box 11 includes a box-like housing formed of side walls 22–25 connected in perpendicular orientation and fixed to a back wall 26 with an open front. Circular knock-out members 28 can be provided to permit access to the interior of the housing by conduit or the like. Mounting lugs or members 29 extend inwardly from the wall edges for mounting electrical receptacles, such as the socket 30 shown in FIG. 1.

A side wall 22 of box 11 carries longitudinally spaced apart first and second fastening means 32, 33 which engage a pattern of first and second holes 19A and 19B to hold the box to the wall stud 12. First fastening means 32 includes an outwardly offset shoulder 34 extended outward from one end of the side wall 22. A plurality of first, second and third fingers 36, 37, 38 are curved to extend longitudinally from the shoulder 34 directed away from side wall 22. Intermediate resilient second finger 37 is curved in a direction to be slightly outwardly offset or spaced apart from adjacent first and third fingers 36, 38 forming a wedge-shaped mouth or gap 40 (see FIG. 2) of sufficient maximum width to closely engage the edge of a mounting hole 19A as best seen in FIG. 3. As shown, inner finger 36 can extend the width of the side wall. The outer edge of the hole 19A is wedged in the diverging inner portion of the gap 40. The width of the intermediate finger 37 corresponds to, but is slightly less than, the width of the oblong hole 19. Gap 40 engages a relatively linear portion of the hole to inhibit rocking motion of the box 11.

Opposite fastening means 33 includes linear means extended in perpendicular relationship to both the surface of the major side member of the wall stud and the major axis of the mounting holes for engagement with an edge of the second mounting hole 19B. An arm 42 extends longitudinally from the side wall 22 to a reverse curve spring loop 43, which terminates in a linear U-shaped tine or prong 44 extended in a direction perpendicular to the longitudinal axis of the wall stud 12 and the major axis of the mounting hole 19. Prong 44 is formed from the flat end of arm 42 and includes a flat base 46 and upwardly turned side walls 47. Longitudinally facing notches 48 are formed in the side walls 47 near the inner end of prong 44 and are of sufficient width for engagement of the edge of a mounting hole 19. The side walls 47 converge forwardly to form a tapered end for ease of insertion into a mounting hole. The width of base 46 combined with the walls 47 corresponds to, but is slightly less than, the width of a mounting hole 19 along the major axis thereof.

Laterally opposite fastening means 33 on the side wall 22 is an L-shaped stop member 50 comprised of a longitudinal member extended from the side wall 22 and an outwardly extended member 51 positioned to abut the surface of the major side member 14 of wall stud 12 when the prong 44 is positioned in one of the mounting holes. Stop member 50 inhibits rocking action of box 11 about a vertical axis.

In use of the electrical receptacle box assembly of the invention, metal wall stud 12 is placed in a generally upright orientation in the usual process of building construction and has a plurality of hole patterns formed by the mounting holes 19. The builder selects a pair of mounting holes 19 according to the desired location of an electrical receptacle box and then mounts the box 11 accordingly. The box is mounted by inserting the intermediate finger 37 of the lower bracket means 32 through a mounting hole 19 whereby the edge of the hole is engaged in the gap 40. Prong 44 is then inserted in the corresponding opposite hole of the hole pattern. Spring loop 43 permits a degree of deflection of the prong 44 as it is inserted in a mounting hole 19. Prong 44 is inserted in the hole 19 until the edge of the hole snaps into place in the notches 48 which engage the relatively linear edge portion of the mounting hole 19 and inhibit rocking motion. Extended member 51 mounted on stop member 50 further inhibits rocking motion whereby the box 11 is securely mounted to the wall stud 12 for mounting of receptacles 30 and the like and eventual covering by a suitable wallboard.

Referring to FIGS. 4 through 7, there is shown an electrical receptacle box assembly according to another form of the invention indicated generally at 54 and including an electrical receptacle box 55 mounted on a generally upright wall stud 56. Wall stud 56 is of the variety having a relatively thin-walled major side member 58 with perpendicularly orientated end members 59, 60 and relatively short, inwardly turned lips or flanges 61. Major side member 58 is prepared with a vertical row of linearly aligned mounting holes or openings 63 which are spaced apart in patterns of two for purposes of mounting the electrical receptacle box. A second row of mounting openings 64 can be provided along the opposite edge of the major side member 58. The openings 63, 64 are oval or oblong with a major axis horizontally orientated when the metal wall stud is in the generally upright orientation as shown.

Electrical receptacle box 55 includes a box-like housing formed of side walls 66–69 connected in perpendicular orientation and fixed to a back wall 70 with an open front. Mounting lugs or members 72 are provided extending inwardly from the wall edges for mounting the electrical receptacles, such as the outlet socket 73 shown in FIG. 4.

Figure 6:
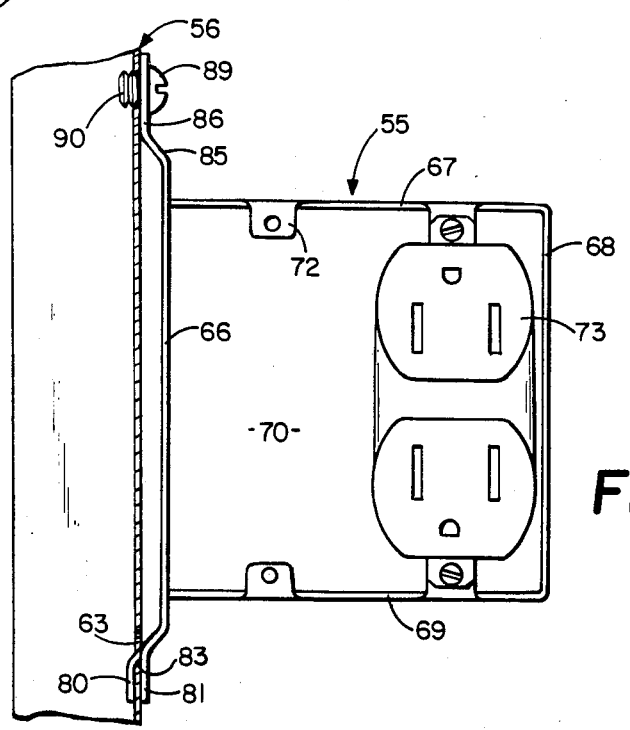
FIG. 6 is a front elevational view of the electrical receptacle box assembly of FIG. 4 with portions of the wall stud removed for illustration.

A side wall 66 of the box 55 carries first and second fastening means 75, 76 to mount the electrical receptacle box to a pair of mounting holes. The first fastening means 75 is like that shown in FIG. 1 through 3 and includes an offset shoulder 78 angularly extended away from the side wall 66. First, second and third fingers 79, 80 and 81 extend longitudinally from the shoulder 78. Intermediate second finger 80 is slightly offset from adjacent fingers 79, 81 forming a wedge-shaped gap 83 having a maximum width of sufficient dimension to closely engage the edge of a mounting hole. As shown in FIG. 6, the lower edge of a mounting hole 63 is engaged in the wedge 83 straddled by the intermediate finger 80 and the adjacent fingers 79, 81. The diverging configuration of the gap 83 wedges the upper edge of the mounting hole in place. The portion of the hole edge engaged in gap 83 is relatively linear resulting in a stable engagement.

Second bracket means 76 includes a second shoulder 86 longitudinally extended from the side wall 66 with an offset portion terminating in a longitudinal flat tab or plate 86. Plate 86 has a mounting hole 88 which aligns with one of the mounting holes 63 on the wall stud 56 when the bracket means 75 is engaged in a corresponding opposite mounting hole. A linear fastener comprised as a screw 89 having a pointed shank 90 is threaded through the mounting hole 88 and through the mounting hole 63 on the wall stud 56. Shank 90 has a diameter near the head of screw 89 of sufficient width that the threads engage the edges of the mounting hole 63 to hold the mounting plate 86 in place and secure the electrical receptacle box 55.

In use of the assembly 54, one of the mounting holes 63 of a suitable pattern is selected and the intermediate finger 80 is placed through the hole, such that the edge of the hole is engaged in the wedge 83 defined between the intermediate finger 80 and adjacent side fingers 79, 81. The box is rotated to the point where the plate 86 comes into contact with the wall member 58 of the metal wall stud 56. Screw 89 is threaded through the opening 88 and mounting plate 86 and through the mounting hole 63 on the wall stud 56. The outer diameter of the threads of the screw are such that they engage the edge portions of the hole to hold the box in assembled relationship to the wall stud. Electrical receptacles are then mounted to the box preparatory to installation of wallboard.

Occasionally, it is necessary or convenient to mount the electrical receptacle box on the interior of the metal wall stud or the surface of major side member 14 opposite that shown in FIG. 1. A spacer or extension member 93 is provided for such purpose. FIG. 11 shows the electrical receptacle box assembly components of FIG. 1 in assembly view, along with an extension member 93 and with metal wall stud 12 in reverse or turned around orientation in order to expose the inner surface of major side member 14.

Figure 7:
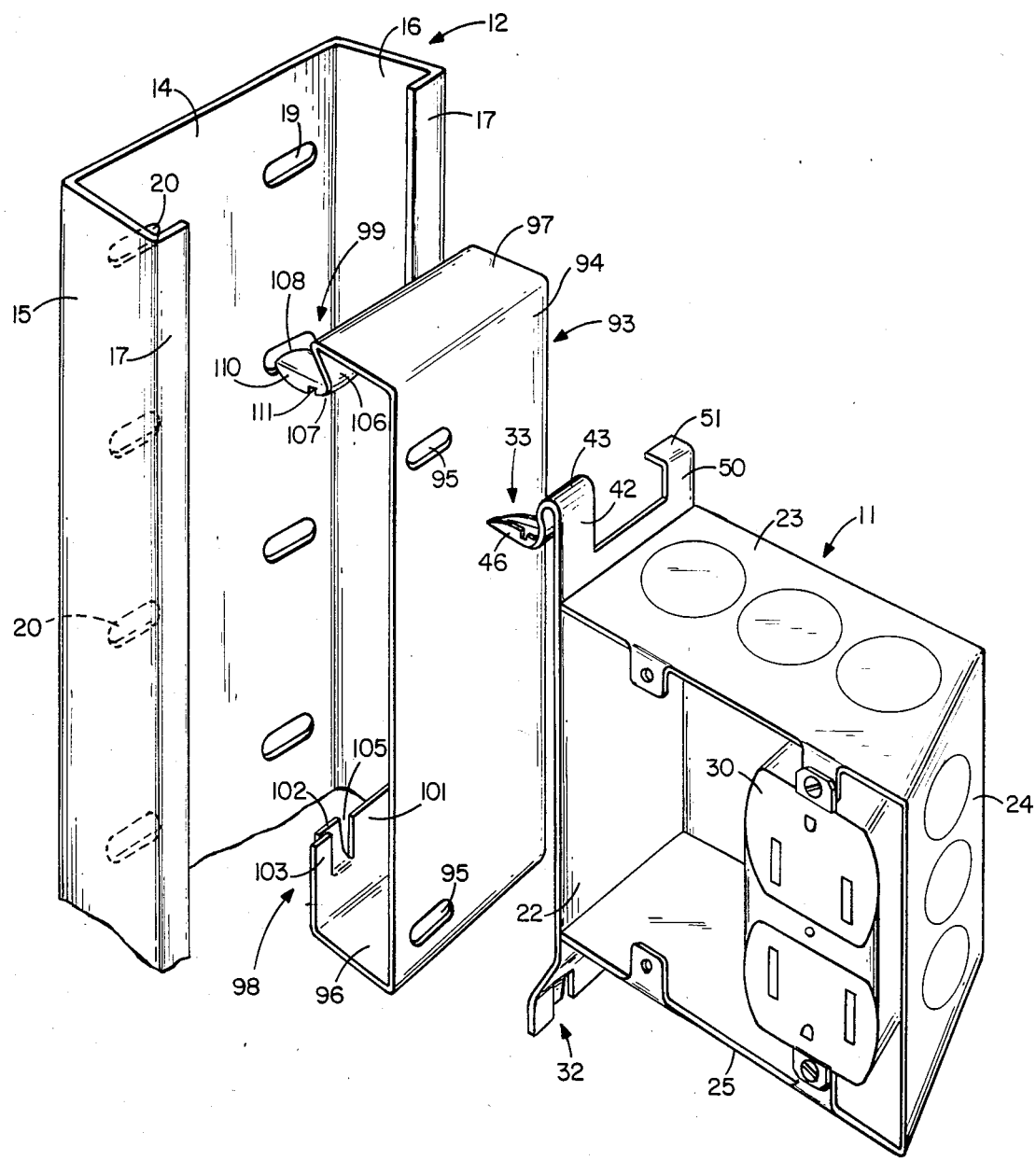
FIG. 7 is an exploded assembly view of the electrical receptacle box assembly of FIG. 1 showing the use of a spacer member in order that the electrical receptacle box can be mounted on the interior surface of the major side member of the wall stud.

As shown in FIG. 7, extension member 93 is generally channel-shaped having a flat, thin-walled mounting surface or face 94 with a pair of oblong mounting holes 95 vertically spaced apart according to the mounting hole pattern of wall stud 12. Mounting holes 95 are positioned to accept the fastening means 32, 33 of electrical receptacle box 11 when extension member 93 is mounted on wall stud 12 with the face 94 in parallel relationship to the major side member 14. End legs 96, 97 extend in perpendicular relationship from the ends of the mounting face 94 toward the major side member 14 and are of a length approximating the depth of wall stud 12 between the flanges 17 and inner surface of major side member 14.

End legs 96, 97 carry first and second fastening means 98, 99 for mounting to mounting holes 20 located on major side member 14. First fastening means includes first, second and third spaced-apart fingers 101, 102, and 103, longitudinally extended from the inner end of the first end leg 96. The fingers extend longitudinally inward with respect to the extension member 93, or upward as shown in FIG. 7. Intermediate finger 102 is outwardly offset with respect to adjacent fingers 101, 103 forming a gap 105 of a width for engagement with a relatively linear portion of one of the mounting holes 20 on major side member 14 of wall stud 12.

Second fastening means 99 includes a shoulder 106 curved inwardly from the end of second leg 97 forming a horizontal spring loop 107. A linear prong 108 extends outward from spring loop 107 in a direction perpendicular to the axis of wall stud 12 and the major axis of mounting hole 20. Spring loop 107 allows a measure of resilient deflection of prong 108. Prong 108 has downwardly turned side walls 110 that are outwardly convergent forming a tapered tip. Longitudinal notches 111 are formed in side walls 110 toward an inner end of prong 108 and have a sufficient width for engagement of the edge of a mounting hole 20. The distance between the first and second fastening means 98, 99 is slightly less than the corresponding distance between mounting hole edges of a pair of holes 20 forming a pattern. The finger 102 of the first fastening means 98 is inserted in a mounting hole 20 with the edge resting in the gap 105 as earlier described. Under slight spring deflection, prong 108 is inserted through the second hole of the pattern and moved inwardly until the notches 111 engage the edge of the hole to secure the extension member 93 in place. Electrical receptacle box 11 is then mounted to the extension member 93 as though it were a portion of wall stud 12. The first and second fastening means 32, 33 engage the oblong mounting holes 95 located on the mounting face 94 to secure the box in place with the opening for the box clear of the wall stud 12 and accessible for mounting of electrical receptacles and eventual covering by a suitable wallboard.

While there has been shown and described certain preferred embodiments of electrical receptacle boxes according to the invention, it will be apparent that deviations and changes can be had from the embodiments shown without departing from the scope and spirit of the invention.

I claim:
1. An electrical receptacle box assembly comprising:
a longitudinal wall stud having a thin-walled major side member and at least one hole pattern prepared in the major side member comprising two longitudinally spaced apart mounting holes, each having a generally oblong shape with a major axis perpendicular to the longitudinal axis of the wall stud;
an electrical receptacle box having a housing with a first side wall located proximate the major side member of the wall stud and carrying first and second longitudinally spaced apart fastening means for connection with first and second holes of a hole pattern on the wall stud;
first fastening means including a shoulder outwardly offset from the side wall, first, second and third longitudinally extended fingers extending from the shoulder, one of said fingers being outwardly offset with respect to the others forming a wedge-shaped gap releasably engageable with the edge of a first mounting hole of a pattern;
second fastening means including a second shoulder carrying linear means orientated perpendicular to the surface of the major side member of the wall stud and engageable with the edges of the second mounting hole of the pattern cooperating with the mounting hole edge to secure the linear means with respect to the wall stud.

2. The electrical receptacle box of claim 1 wherein: the linear means of the second fastening means includes a tine inserted in the second mounting hole, said tine connected to one end of a reversed curved spring loop, the other end being of the reverse curved spring loop being connected to said first side wall.

3. The electrical receptacle box of claim 2 wherein: said tine is comprised as a U-shaped member having a base and outwardly turned side walls, said side walls having notch means engageable with the edge of the mounting hole.

4. The electrical receptacle box of claim 3 wherein: said second finger of the first fastening means is outwardly offset from the others and has a width corresponding to and slightly less than the width of the first mounting hole.

5. The electrical receptacle box assembly of claim 4 wherein: said electrical receptacle box has second, third, and fourth side walls connected in perpendicular relationship with respect to the first side wall and a back wall connected to the side walls.

6. The electrical receptacle box of claim 1 wherein: said second fastening means includes a longitudinal flat tab connected to the first wall in facing relationship to the second mounting hole and having a screw hole in alignment with the second mounting hole, and a linear threaded screw member extending through the screw hole of the tab and through the second mounting hole, having a diameter for engagement with the edges of the second mounting hole.

7. The electrical receptacle box assembly of claim 6 wherein: said second finger of the first fastening means is outwardly offset from the others and has a width corresponding to, and slightly less than, the width of the first mounting hole.

8. The electrical receptacle box assembly of claim 7 wherein: said box housing includes second, third, and fourth side walls along with the first side wall orientated in perpendicular relationship and connected to a back wall.

9. The electrical receptacle box assembly of claim 8 including: a plurality of patterns of mounting holes longitudinally spaced on the major member of the wall stud.

10. The electrical receptacle box assembly of claim 1 including: an extension member to space the receptacle box from the major side member of the wall stud, said extension member having a thin-walled mounting face with a hole pattern comprised of first and second mounting holes for connection with the first and second fastening means of the electrical receptacle box; first and second end legs extended in perpendicular relationship from longitudinal ends of the mounting face; first and second extension member fastening means carried on the outer ends of the first and second legs for connection to first and second mounting holes of a hole pattern on the major side member of the wall stud.

11. The electrical receptacle box assembly of claim 10 wherein: said first fastening means on the first leg of the extension member includes first, second, and third spaced-apart fingers longitudinally extended from the inner end of the first leg, one of said fingers being outwardly offset with respect to the others forming a gap of a width sufficient for engagement with an edge of one of the mounting holes of a hole pattern on the major side member of the wall stud.

12. The electrical receptacle box of claim 11 wherein: said second fastening means on the second leg of the extension member includes a linear tine connected at one end to a spring loop and positioned in perpendicular relationship to the major side member surface of the wall stud and said spring loop being connected at an opposite end to the second extension member mounting leg.

13. An electrical receptacle box assembly comprising:
a wall stud with a relatively thin-walled major side member having a mounting hole pattern including first and second longitudinally spaced-apart mounting holes;
an electrical receptacle box having a first side wall carrying first and second fastening means connectable to first and second holes of the mounting hole pattern of the wall stud;
said first fastening means including first, second, and third laterally spaced longitudinal fingers, said second finger being outwardly offset with respect to the first and third fingers forming a wedge-shaped gap for engagement with a lateral edge of the first mounting hole;
said second fastening means including linear means extendible through and engageable with the second mounting hole when the first fastening means is engaged with the first mounting hole of the hole pattern on the major side member of the wall stud.

14. The electrical receptacle box of claim 13 wherein: said second fastening means includes a linear tine connected by spring loop means to said first wall of the electrical receptacle box, said tine having an axis in perpendicular relationship to the major side member surface of the major wall stud and insertable through said second hole of the hole pattern, said tine having notch means engageable with the edge of the second hole when the tine is inserted through the second hole.

15. The electrical receptacle box assembly of claim 14 wherein: said tine is U-shaped member having a bottom wall and perpendicular side walls, said notch means including transverse facing notches in the side walls of the tine, said tine being spaced from the fingers of the first fastening means so as to be insertable into the second hole under slight spring deflection.

16. The electrical receptacle box assembly of claim 15 wherein: an extension member to space the receptacle box from the major side member of the wall stud, said extension member having a thin-walled mounting face with a hole pattern comprised of first and second mounting holes for connection with the first and second fastening means of the electrical receptacle box; first and second end legs extended in perpendicular relationship from longitudinal ends of the mounting face; first and second extension member fastening means carried on the outer ends of the first and second legs for connection to first and second mounting holes of a hole pattern on the major side member of the wall stud.

* * * * *

UNITED STATES PATENT AND TRADEMARK OFFICE
CERTIFICATE OF CORRECTION

PATENT NO. : 4,576,302

DATED : March 18, 1986

INVENTOR(S) : Robert A. Smolik

It is certified that error appears in the above-identified patent and that said Letters Patent is hereby corrected as shown below:

Column 5, line 42, "for" should be -- of --.

Column 6, line 54, "major member" should be -- major side member --.

Signed and Sealed this

Eighth Day of July 1986

[SEAL]

Attest:

DONALD J. QUIGG

Attesting Officer

Commissioner of Patents and Trademarks